(12) United States Patent
Wang et al.

(10) Patent No.: US 11,442,292 B2
(45) Date of Patent: Sep. 13, 2022

(54) SPECTACLES

(71) Applicants: BEIJING BOE DISPLAY TECHNOLOGY CO., LTD., Beijing (CN); BEIJING BOE TECHNOLOGY DEVELOPMENT CO., LTD., Beijing (CN)

(72) Inventors: Tingting Wang, Beijing (CN); Qi Wang, Beijing (CN); Yan Yan, Beijing (CN)

(73) Assignees: BEIJING BOE DISPLAY TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 569 days.

(21) Appl. No.: 16/344,930

(22) PCT Filed: Sep. 19, 2018

(86) PCT No.: PCT/CN2018/106422
§ 371 (c)(1),
(2) Date: Apr. 25, 2019

(87) PCT Pub. No.: WO2019/140936
PCT Pub. Date: Jul. 25, 2019

(65) Prior Publication Data
US 2021/0325695 A1    Oct. 21, 2021

(30) Foreign Application Priority Data

Jan. 22, 2018 (CN) .......................... 201810058934.9

(51) Int. Cl.
*G02C 7/10* (2006.01)
*G02B 1/18* (2015.01)
(Continued)

(52) U.S. Cl.
CPC ............... *G02C 7/101* (2013.01); *G02B 1/18* (2015.01); *G02C 5/008* (2013.01); *G02C 7/085* (2013.01); *G02C 11/10* (2013.01)

(58) Field of Classification Search
CPC .......... G02C 1/00; G02C 11/10; G02C 7/101; G02C 7/085; G02C 5/008; G02C 7/041;
(Continued)

(56) References Cited

U.S. PATENT DOCUMENTS

2006/0152672 A1\* 7/2006 Hendriks ................. G02B 3/14
351/159.04
2010/0208195 A1 8/2010 Gupta et al.
(Continued)

FOREIGN PATENT DOCUMENTS

CN            1820221 A    8/2006
CN          202886754 U    4/2013
(Continued)

OTHER PUBLICATIONS

PCT International Search Report, Application No. PCT/CN2018/106422, dated Dec. 21, 2018, 6 pages: with English translation.
(Continued)

*Primary Examiner* — Cara E Rakowski
(74) *Attorney, Agent, or Firm* — Armstrong Teasdale LLP

(57) ABSTRACT

The present disclosure relates to spectacles. The spectacles include a lens including a first portion and a second portion disposed opposite each other and a first cavity between the first portion and the second portion, a frame surrounding the lens and supporting the lens, a colored liquid disposed in the interior space, a first hydrophobic dielectric film disposed on an inner surface of the frame, a first electrode disposed between the inner surface of the frame and the first hydrophobic dielectric film, and a second electrode disposed in the interior space and in contact with the colored liquid. The
(Continued)

frame has a second cavity defined by an inner surface of the frame. The second cavity is in communication with the first cavity to form an interior space.

9 Claims, 7 Drawing Sheets

(51) Int. Cl.
*G02C 5/00* (2006.01)
*G02C 7/08* (2006.01)
*G02C 11/00* (2006.01)

(58) Field of Classification Search
CPC . G02C 7/049; G02C 7/08; G02C 7/16; G02C 7/10; G02C 7/105; G02C 7/108; G02B 1/18; G02B 7/10; G02B 7/101; G02B 3/14; G02B 26/005; G02B 26/02; G02B 3/12; G02F 1/1335
USPC ............................... 351/158, 41, 49; 349/13
See application file for complete search history.

(56) References Cited

U.S. PATENT DOCUMENTS

| | | | |
|---|---|---|---|
| 2010/0208328 A1* | 8/2010 | Heikenfeld | G02B 26/005 359/290 |
| 2013/0050608 A1* | 2/2013 | Hu | G02B 26/005 349/58 |
| 2013/0050807 A1* | 2/2013 | Lee | G02B 26/005 427/108 |
| 2017/0068112 A1 | 3/2017 | Bhatta et al. | |
| 2017/0287410 A1* | 10/2017 | Ho | G09G 5/14 |

FOREIGN PATENT DOCUMENTS

| | | | | |
|---|---|---|---|---|
| CN | 103197437 A | | 7/2013 | |
| CN | 103235420 A | | 8/2013 | |
| CN | 206400205 U | | 8/2017 | |
| JP | 2001228307 A | | 8/2001 | |
| WO | WO-2005003843 A1 | * | 1/2005 | ............. G02C 7/101 |
| WO | 2009036272 A1 | | 3/2009 | |
| WO | 2011047311 A1 | | 4/2011 | |

OTHER PUBLICATIONS

PCT Written Opinion, Application No. PCT/CN2018/106422, dated Dec. 21, 2018, 5 pages.: with English translation of relevant part.
European Extended Search Report, Application No. 18867308.1, dated Sep. 9, 2021, 10 pps.
Mias et al. "Topical Review; A review of active optical devices: I. Amplitude modulation", Journal of Micromechanics and Microengineering, Institute of Physics Publishing, vol. 18, No. 8, Aug. 1, 2008, p. 83001, XP020145081.

* cited by examiner

SPECTACLES

CROSS REFERENCE TO RELATED APPLICATIONS

This patent application is a National Stage Entry of PCT/CN2018/106422 filed on Sep. 19, 2018, which claims the benefit and priority of Chinese Patent Application No. 201810058934.9 filed on Jan. 22, 2018, the disclosures of which are incorporated by reference herein in their entirety as part of the present application.

BACKGROUND

The present disclosure relates to a field of display technology, and in particular, to spectacles.

Spectacles varying color or light transmittance as the light intensity of the environment changes is more and more popular. However, such spectacles do not provide the user with an optimal visual effects.

BRIEF DESCRIPTION

Embodiments of the present disclosure provide spectacles.

An object of the present disclosure is to provide spectacles. The spectacles include a lens including a first portion and a second portion disposed opposite each other and a first cavity between the first portion and the second portion, a frame surrounding the lens and supporting the lens, a colored liquid disposed in the interior space, a first hydrophobic dielectric film disposed on an inner surface of the frame, a first electrode disposed between the inner surface of the frame and the first hydrophobic dielectric film, and a second electrode disposed in the interior space and in contact with the colored liquid. The frame has a second cavity defined by an inner surface of the frame. The second cavity is in communication with the first cavity to form an interior space.

In an embodiment, the frame is elastic.

In an embodiment, the spectacles further include an elastic support portion adjacent the frame and providing support between the first portion and the second portion.

In an embodiment, the spectacles further include a second hydrophobic dielectric film disposed on an inner surface of the first portion.

In an embodiment, the spectacles further include a second hydrophilic dielectric film disposed on an inner surface of the second portion.

In an embodiment, a distance between the first portion and the second portion is configured to generate a capillary force for driving the colored liquid.

In an embodiment, the distance between the first portion and the second portion is about 1 mm.

In an embodiment, the colored liquid includes a polar liquid or a non-polar liquid.

In an embodiment, the spectacles further include a control device coupled to the first electrode and the second electrode for controlling movement of the colored liquid.

In an embodiment, the control device includes a power switch and a mode selection switch located at the frame or an arm of the spectacles, and a photosensitive device located on the frame.

In an embodiment, the control device further includes a first resistor, a variable resistor, and a power source.

In an embodiment, the mode selection switch includes a first terminal, a second terminal, and a third terminal. The first terminal of the mode selection switch is capable of being selectively coupled to one of the second terminal of the mode selection switch and the third terminal of mode selection switch. The second terminal of the mode selection switch is coupled to a first terminal of the photosensitive device. A second terminal of the photosensitive device is coupled to a first terminal of the power switch. A second terminal of the power switch is coupled to a first terminal of the first resistor. A second terminal of the first resistor is coupled to a first terminal of the power source. A second terminal of the power source is coupled to the first terminal of the mode selection switch. The third terminal of the mode selection switch is coupled to a first terminal of the variable resistor. A second terminal of the variable resistor is coupled to a first terminal of the power switch. One of the first electrode and the second electrode is coupled to the first terminal of the power switch. The other of the first electrode and the second electrode is coupled to the second terminal of the power source.

In an embodiment, the control device further includes a variable resistor and a power source.

In an embodiment, the mode selection switch includes a first terminal, a second terminal, and a third terminal. The first terminal of the mode selection switch is capable of being selectively coupled to one of the second terminal of the mode selection switch and the third terminal of the mode selection switch. A second terminal of the mode selection switch is coupled to a first terminal of the photosensitive device. A second terminal of the photosensitive device is coupled to a first terminal of the power source. The third terminal of the mode selection switch is coupled to a first terminal of the variable resistor. A second terminal of the variable resistor is coupled to a first terminal of the power source. A second terminal of the power source is coupled to one of the first electrode and the second electrode. The other of the first electrode and the second electrode is coupled to a first terminal of the power switch. A second terminal of the power switch is coupled to the first terminal of the mode selection switch.

BRIEF DESCRIPTION OF THE DRAWINGS

To describe the technical solutions in the embodiments of the present disclosure more clearly, the accompanying drawings of the embodiments are briefly described below. It should be understood that the drawings described below refer only to some embodiments of the present disclosure, and not to restrict the present disclosure, wherein.

DETAILED DESCRIPTION

Figure 1:
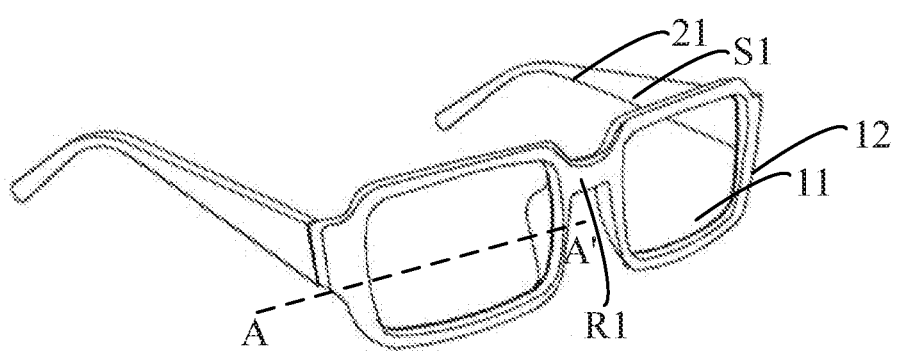
FIG. 1 is a schematic view of spectacles according to an embodiment of the present disclosure.

In order to make the technical solutions and advantages of the embodiments of the present disclosure more comprehensible, the embodiments of the present disclosure are described below with reference to the accompanying drawings.

As used herein and in the appended claims, the singular form of a word includes the plural, and vice versa, unless the context clearly dictates otherwise. Thus, the references "a", "an", and "the" are generally inclusive of the plurals of the respective terms. Similarly, the words "comprise", "comprises", and "comprising" are to be interpreted inclusively rather than exclusively.

For purposes of the description hereinafter, the terms "upper", "lower", "right", "left", "vertical", "horizontal", "top", "bottom", and derivatives thereof shall relate to the disclosure, as it is oriented in the drawing Figures. The terms "overlying", "atop", "positioned on" or "positioned atop" means that a first element, such as a first structure, is present on a second element, such as a second structure, wherein intervening elements, such as an interface structure, e.g. interface layer, may be present between the first element and the second element. The term "direct contact" means that a first element, such as a first structure, and a second element, such as a second structure, are connected without any intermediary conducting, insulating or semiconductor layers at the interface of the two elements.

For color-changing spectacles based on the principle of electro-wetting, the lens needs to be divided into a plurality of sub-pixels through a black matrix layer, sub-cavities and corresponding driving circuits are respectively fabricated. However, the black matrix layer between pixels greatly reduces the maximum transmittance of the lens. In addition, reflection of a trace of the driving circuit of each pixel affects the user's visual effect. Even if these problems are neglected, the minimum pixel size produced with the current technical means cannot overcome the fishnet pattern phenomenon at such a distance from the human eye, and the field of view will be severely grained.

FIG. 1 is a schematic view of spectacles according to an embodiment of the present disclosure. As shown in FIG. 1, the spectacles may include a lens 11, a frame 12 surrounding the lens 11 and supporting the lens, and an arm 21. A photosensitive device R1 may be placed between two lenses, and a mode selection switch S1 may be provided on the arm. Of course, the positions of the photosensitive device and the mode selection switch can also be set at other positions as needed. The user can select an automatic mode or a manual mode via the mode selection switch. The photosensitive device can sense changes in the intensity of the external light, thereby effecting changes in the position of the colored liquid according to changes in optical intensity. In the automatic adjustment mode, the position of the colored liquid can be automatically changed as the external light intensity changes, thereby adjusting the light transmittance of the spectacles. In the manual adjustment mode, the position of the colored liquid can be manually changed to adjust the light transmittance of the spectacles according to desire.

Figure 2:
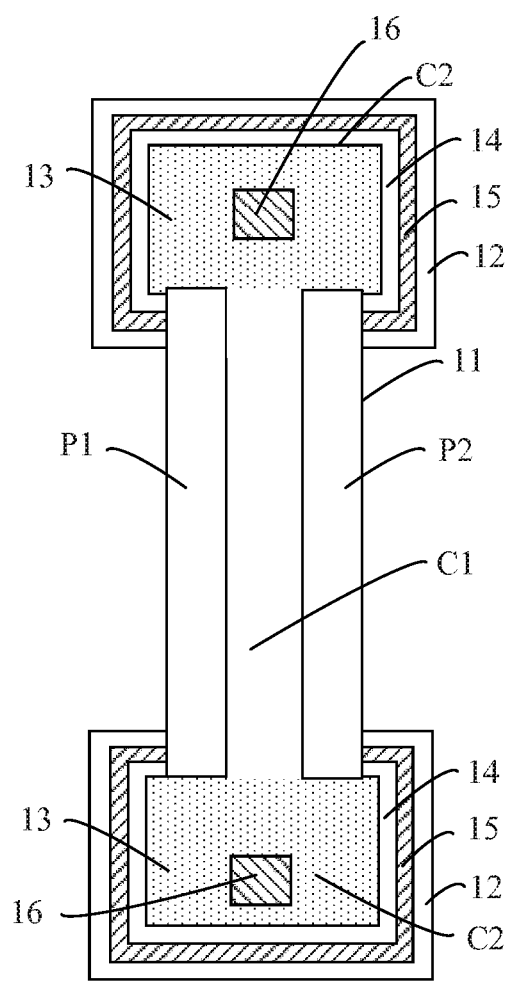
FIG. 2 is a schematic cross-sectional view of the spectacles of FIG. 1 taken along line AN.

FIG. 2 is a schematic cross-sectional view of the spectacles of FIG. 1 taken along line AA'. As shown in FIG. 2, the spectacles of an embodiment of the present disclosure include a lens 11 including a first portion P1 and a second portion P2 disposed opposite to each other and a first cavity C1 between the first portion P1 and the second portion P2, a frame 12 surrounding the lens 11 and supporting the lens, a colored liquid 13 disposed in the interior space, a first hydrophobic dielectric film 14 disposed on an inner surface, a first electrode 15 disposed between the inner surface and the first hydrophobic dielectric film, and a second electrode 16 disposed in the inner space and in contact with the colored liquid. The frame 12 has a second cavity C2 defined by an inner surface of the frame. The second cavity C2 is in communication with the first cavity C1 to form an interior space. It will be understood that the present disclosure has no limitation on the position of the second electrode. The second electrode may be in the first cavity or in the second cavity as long as it is in contact with the colored liquid. The hydrophobic dielectric film may include polytetrafluoroethylene.

With such a structure, the position of the colored liquid can be changed between the first cavity and the second cavity, thereby adjusting the light transmittance of the spectacles. The interior of the lens is set to an entire interior space, eliminating the need for multiple sub-cavity structures. Accordingly, control can be performed by one driving circuit (for example, it can be located in the frame), so that the problem of affecting the user's visual experience by the control wiring of the plurality of sub-cavities can be avoided. When the light transmittance of the spectacles reaches the maximum, the colored liquids can be completely accommodated in the frame, thereby avoiding the problem of the light transmittance and the inconvenience caused by the colored liquid remaining at the lens. In addition, embodiments of the present disclosure are also capable of adjusting the light transmittance of the spectacles using only one colored liquid, reducing the influence of surface tension on the position exchange of the two liquids in the cavity, reducing manufacturing costs, and improving the response speed of the spectacles.

In an embodiment, the frame may be elastic. An elastic frame can better accommodate colored liquid. The volume of the second cavity of the frame when the liquid is contained therein is larger than the volume of the second cavity of the frame when the liquid is not contained therein.

Figure 3A:
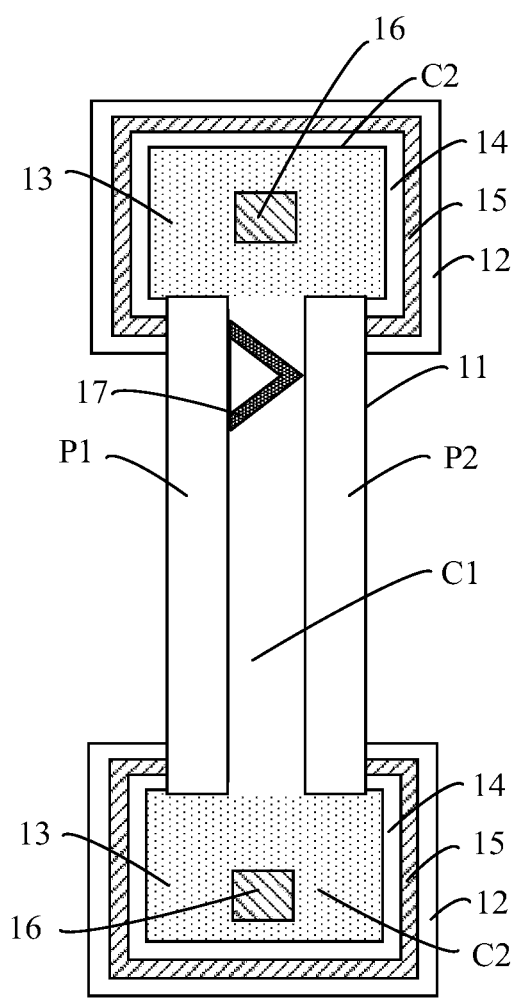
FIGS. 3A and 3B are schematic cross-sectional views of spectacles according to an embodiment of the present disclosure.
Figure 3B:
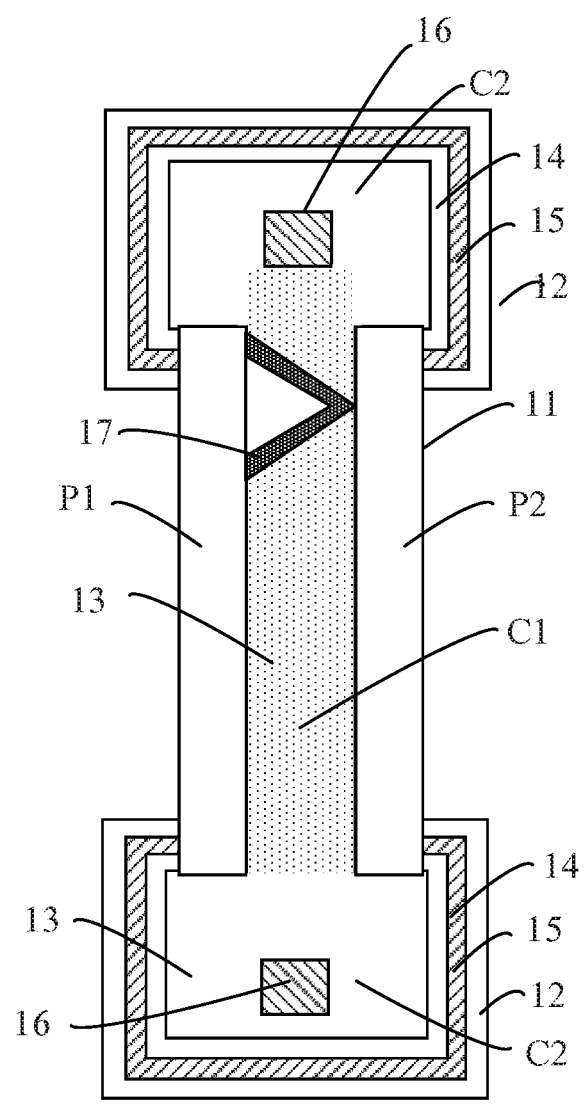

FIG. 3A and FIG. 3B are schematic cross-sectional views of spectacles according to an embodiment of the present disclosure. In the embodiment illustrated in FIG. 3A and FIG. 3B, the spectacles may also include an elastic support portion 17 adjacent the frame and providing support between the first portion and the second portion. The elastic support portion 17 (for example, a spring) is extendable in a direction perpendicular to the extending direction of the lens 11, so that the distance between the first portion P1 and the second portion P2 of the lens 11 can be adjusted, which can reduce bubbles produced in the liquid. When the colored liquid 13 is positioned in the frame 12, as shown in FIG. 3A, the elastic support portion 17 is not elongated in a direction perpendicular to the extending direction of the lens 11. The space between the first portion P1 and the second portion P2 of the lens 11 is small. The space of the first cavity C1 is also small. When the colored liquid 13 is in the first cavity C1 between the first portion P1 and the second portion P2 of the lens, as shown in FIG. 3B, the elastic support portion 17 extends in a direction perpendicular to the extending direction of the lens 11. The distance between the first portion P1 and the second portion P2 of the lens 11 is large, and the space of the first cavity C1 is also large. The elastic extension of the elastic support portion 17 can reduce the generation of bubbles in the liquid.

Figure 4:
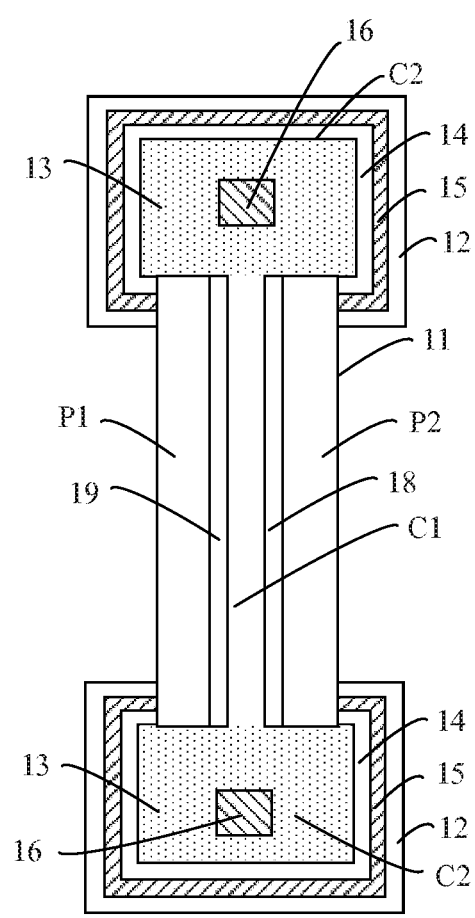
FIG. 4 is a schematic cross-sectional view of spectacles according to an embodiment of the present disclosure.

FIG. 4 is a schematic cross-sectional view of spectacles according to an embodiment of the present disclosure. In the embodiment shown in FIG. 4, the spectacles include a second hydrophobic dielectric film 18 or a hydrophilic dielectric film 19 disposed on an inner surface of one of the first portion P1 and the second portion P2. As shown in FIG. 4, the spectacles may further include a hydrophilic dielectric film 19 or a second hydrophobic dielectric film 18 disposed on the inner surface of the other of the first portion P1 and the second portion P2. Both the second hydrophobic dielectric film and the hydrophilic dielectric film may be provided at the same time, or only one of them may be provided. Although it is shown in FIG. 4 that the second hydrophobic dielectric film 18 is located on the inner surface of the first portion P1, the second hydrophobic dielectric film 18 may be located on the inner surface of the second portion P2. The hydrophilic dielectric film 19 may also be located on the inner surface of the first portion P1. By providing the second hydrophobic dielectric film or the hydrophilic dielectric film, it is possible to distribute the liquid more uniformly in the first cavity.

In an embodiment, the distance between the first portion and the second portion is configured to produce a capillary force for driving the colored liquid. This allows the liquid in the spectacles to overcome the force of gravity and achieve a change in position under the influence of capillary forces. In an embodiment, the distance between the first portion and the second portion can be set to about 1 mm.

In an embodiment, the colored liquid may include a polar liquid. For example, the colored liquid may include a mixture of water and/or alcohol. The colored liquid can include a conductive solution. In an embodiment, the colored liquid can include a non-polar solution. For example, colored liquid may include an oil.

Figure 5:
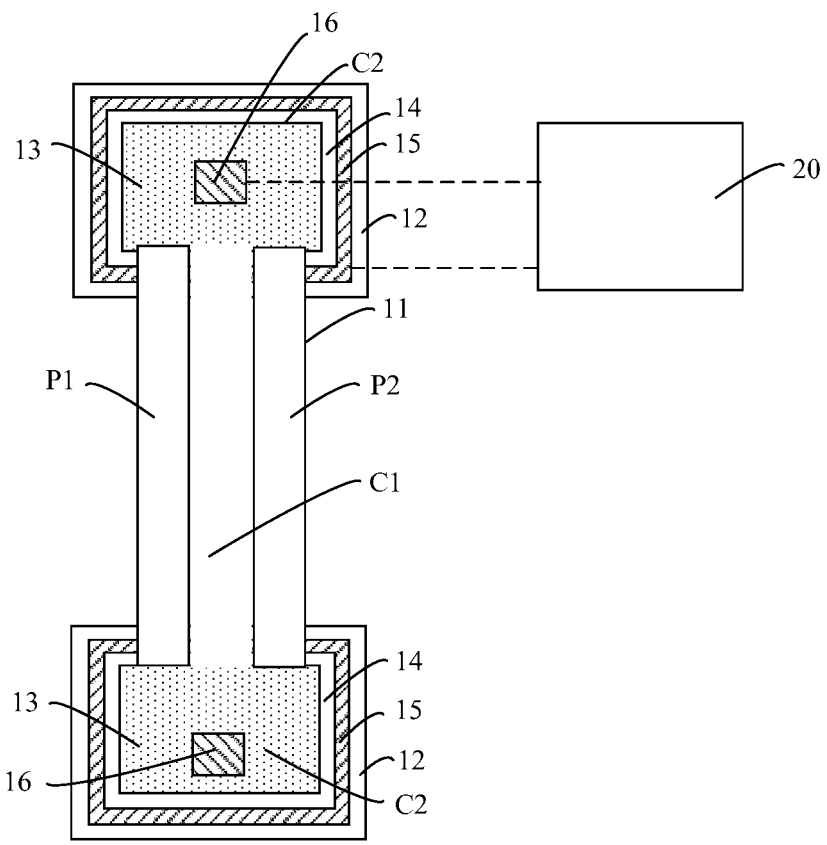
FIG. 5 is a schematic cross-sectional view of spectacles according to an embodiment of the present disclosure.

FIG. 5 is a schematic cross-sectional view of spectacles according to an embodiment of the present disclosure. As shown in FIG. 5, in an embodiment, the spectacles may further include a control device 20 coupled to the first electrode 15 and the second electrode 16 for controlling the movement of the colored liquid.

In an embodiment, the control device includes a power switch and a mode selection switch located at the frame or an arm of the spectacles, and a photosensitive device located on the frame. The mode selector switch can select either automatic mode or manual mode. The photosensitive device can sense changes in the intensity of the external light, thereby changing the position of the colored liquid according to changes in optical intensity. In the automatic mode, the position of the colored liquid can be automatically changed as the external light intensity changes, thereby adjusting the light transmittance of the spectacles. In the manual mode, the position of the colored liquid can be manually changed to adjust the light transmittance of the lens according to desire. Such spectacles can realize the change of the transmittance of the spectacles according to the preference of a user, and can satisfy the best visual effect for different people.

Figure 6:
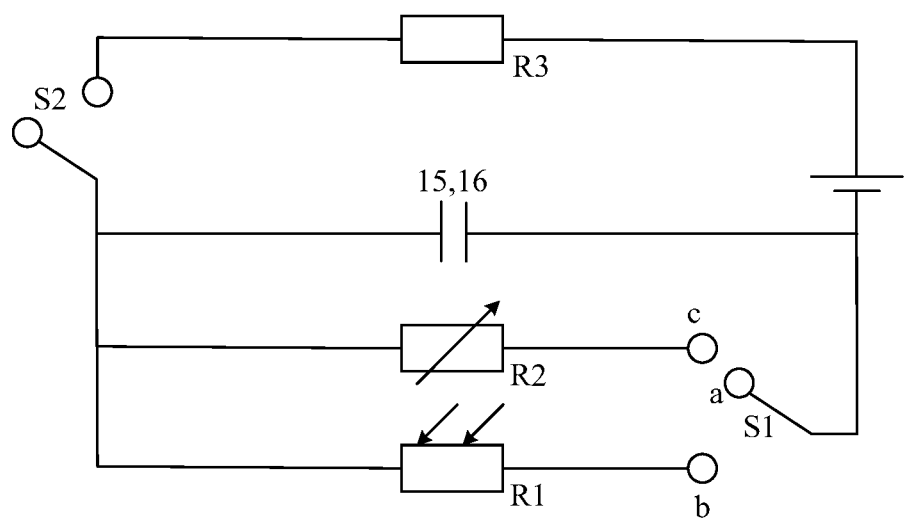
FIG. 6 is a schematic diagram of a control circuit according to an embodiment of the present disclosure.

In an embodiment, the control device may further include a first resistor, a variable resistor, and a power source. FIG. 6 is a schematic diagram of a control circuit according to an embodiment of the present disclosure. As shown in FIG. 6, the mode selection switch S1 includes a first terminal a, a second terminal b, and a third terminal c. The first terminal a of the mode selection switch S1 can be selectively coupled to one of the second terminal b and the third terminal c. The second terminal b of the mode selection switch S1 is coupled to a first terminal of the photosensitive device R1. A second terminal of the photosensitive device R1 is coupled to a first terminal of the power switch S2. A second terminal of the power switch S2 is coupled to a first terminal of the first resistor R3. A second terminal of the first resistor R3 is coupled to a first terminal of the power source. A second terminal of the power source is coupled to the first terminal a of the mode selection switch S1. The third terminal c of the mode selection switch S1 is coupled to a first terminal of the variable resistor R2. A second terminal of the variable resistor R2 is coupled to a first terminal of the power switch S2. One of the first electrode and the second electrode is coupled to the first terminal of the power switch S1. The other of the first electrode and the second electrode is coupled to the second terminal of the power source.

In the case where the colored liquid includes a polar liquid such as water, the spectacles according to embodiments of the present disclosure may operate as follows.

In the automatic mode (the first terminal a is coupled to the second terminal b of the mode selection switch S1 to select the automatic mode), when the external light intensity is weak, the photosensitive device R1 has a large resistance due to less light received. Alternatively, in the manual mode (the first terminal a is coupled to the third terminal c of the mode selection switch S1 to select the manual mode), when the external light intensity is weak, the resistance of the variable resistor R2 may be adjusted to a larger resistance. Since the first electrode 15 and the second electrode 16 are in parallel relationship with the photosensitive device R1 or the variable resistor R2, the voltage difference between the first electrode 15 and the second electrode 16 is relatively large. The voltage difference between the colored liquid 13 and the first hydrophobic dielectric film 14 is also large. Thus, electro-wetting is caused, and the first hydrophobic dielectric film will be relatively hydrophilic. Since the first hydrophobic dielectric film is relatively hydrophilic at this time, the colored liquid is attracted by the first hydrophobic dielectric film and tends to be accommodated in the second cavity C2 of the frame. Therefore, the light transmittance of the spectacles will be large, allowing more light to enter.

In the automatic mode, when the external light intensity is large, the photosensitive device R1 has a small resistance due to relatively more light received. Or, in the manual mode, the resistance of the variable resistor R2 may be adjusted to have a relatively small resistance. Since the first electrode 15 and the second electrode 16 are in parallel relationship with the photosensitive device R1 or the variable resistor R2, the voltage difference between the first electrode 15 and the second electrode 16 is small. The voltage difference between the colored liquid 13 and the first hydrophobic dielectric film 14 is also relatively small. Thus, no electro-wetting occurs, and the first hydrophobic dielectric film is relatively hydrophobic. Since the first hydrophobic dielectric film will be relatively hydrophobic, the colored liquid is repelled by the first hydrophobic dielectric film and tends to be in the first cavity C1 between the first portion P1 and the second portion P2 of the lens. Therefore, the light transmittance of the spectacles will be relatively small, thereby blocking excessive light.

Figure 7:
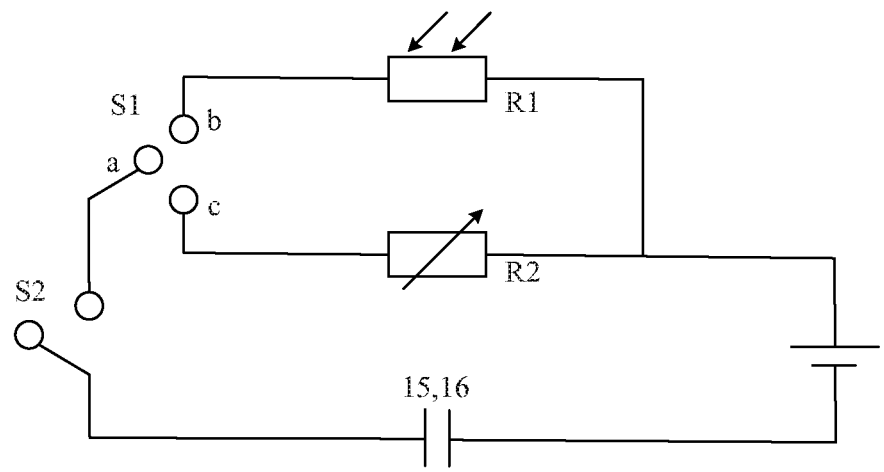
FIG. 7 is a schematic diagram of yet another control circuit according to an embodiment of the present disclosure.

In an embodiment, the control device further includes a variable resistor and a power source. FIG. 7 is a schematic diagram of yet another control circuit according to an embodiment of the present disclosure. As shown in FIG. 7, the mode selection switch S1 includes a first terminal a, a second terminal b, and a third terminal c. The first terminal a of the mode selection switch S1 is capable of being selectively coupled to one of the second terminal b of the mode selection switch and the third terminal c of the mode selection switch. A second terminal b of the mode selection switch S1 is coupled to a first terminal of the photosensitive device R1. A second terminal of the photosensitive device R1 is coupled to a first terminal of the power source. The third terminal of the mode selection switch S1 is coupled to a first terminal of the variable resistor R2. A second terminal of the variable resistor R2 is coupled to a first terminal of the power source. A second terminal of the power source is coupled to one of the first electrode 15 and the second electrode 16. The other of the first electrode 15 and the second electrode 16 is coupled to a first terminal of the power switch S2. A second terminal of the power switch S2 is coupled to the first terminal a of the mode selection switch S1.

In the case where the colored liquid includes a non-polar liquid such as oil, the spectacles according to embodiments of the present disclosure may operate as follows.

In the automatic mode (the first terminal a is coupled to the second terminal b of the mode selection switch S1 to select the automatic mode), when the external light intensity is weak, the photosensitive device R1 has a large resistance due to less light received. Or, in the manual mode (the first terminal a is coupled to the third terminal c of the mode selection switch S1 to select the manual mode), when the external light intensity is weak, the resistance of the variable resistor R2 may be adjusted to have a larger resistance. Since the first electrode 15 and the second electrode 16 are in series relationship with the photosensitive device R1 or the variable resistor R2, the voltage difference between the first electrode 15 and the second electrode 16 is relatively small. The voltage difference between the colored liquid 13 and the first hydrophobic dielectric film 14 is also relatively small, and the first hydrophobic dielectric film is more hydrophobic and more oleophilic. Since the first hydrophobic dielectric film is more oleophilic at this time, the colored liquid is attracted by the first hydrophobic dielectric film and tends to be accommodated in the second cavity C2 of the frame. Therefore, the light transmittance of the spectacles will be large, allowing more light to enter.

In the automatic mode, when the external light intensity is large, the photosensitive device R1 has a small resistance due to more light received. Alternatively, in the manual mode, the resistance of the variable resistor R2 may be adjusted to have a small resistance. Since the first electrode 15 and the second electrode 16 are in series relationship with the photosensitive device R1 or the variable resistor R2, the voltage difference between the first electrode 15 and the second electrode 16 is large. The voltage difference between the colored liquid 13 and the first hydrophobic dielectric film 14 is also large, and the first hydrophobic dielectric film is relatively hydrophilic and oleophobic. Since the first hydrophobic dielectric film is relatively oleophobic, the colored liquid is repelled by the first hydrophobic dielectric film and tends to be in the first cavity C1 between the first portion P1 and the second portion P2 of the lens. Therefore, the light transmittance of the spectacles will be small, thereby blocking excessive light.

It should be appreciated that although automatic adjustment of the spectacles with the photosensitive device is described, other automated devices may be provided to give the photosensitive characteristics. For example, a programmable user mode can be used to change the spectacles.

Having described certain specific embodiments, these embodiments have been presented by way of example only, and are not intended to limit the scope of the present disclosure. Indeed, the novel embodiments described herein may be embodied in various other forms; forms, furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:
1. Spectacles comprising:
   a lens comprising a first portion and a second portion disposed opposite each other and a first cavity between the first portion and the second portion;
   a frame surrounding the lens and supporting the lens, the frame having a second cavity defined by an inner surface of the frame, wherein the second cavity is in communication with the first cavity to form an interior space;
   a colored liquid disposed in the interior space;
   a first hydrophobic dielectric film disposed on the inner surface of the frame;
   a first electrode disposed between the inner surface of the frame and the first hydrophobic dielectric film;
   a second electrode disposed in the interior space formed by the first cavity of the lens and the second cavity of the frame and in contact with the colored liquid; and
   a control device coupled to the first electrode and the second electrode for controlling movement of the colored liquid, wherein the control device comprises a power switch and a mode selection switch located at one of the frame and an arm of the spectacles, and a photosensitive device located on the frame, wherein either:
(i) the control device further comprises a first resistor, a variable resistor, and a power source, wherein the mode selection switch comprises a first terminal, a second terminal, and a third terminal, wherein the first terminal of the mode selection switch is capable of being selectively coupled to one of the second terminal of the mode selection switch and the third terminal of mode selection switch, wherein the second terminal of the mode selection switch is coupled to a first terminal of the photosensitive device, wherein a second terminal of the photosensitive device is coupled to a first terminal of the power switch, wherein a second terminal of the power switch is coupled to a first terminal of the first resistor, wherein a second terminal of the first resistor is coupled to a first terminal of the power source, wherein a second terminal of the power source is coupled to the first terminal of the mode selection switch, wherein the third terminal of the mode selection switch is coupled to a first terminal of the variable resistor, wherein a second terminal of the variable resistor is coupled to the first terminal of the power switch, and wherein one of the first electrode and the second electrode is coupled to the first terminal of the power switch, and the other of the first electrode and the second electrode is coupled to the second terminal of the power source,
or,
(ii) the control device further comprises a variable resistor and a power source, wherein the mode selection switch comprises a first terminal, a second terminal, and a third terminal, wherein the first terminal of the mode selection switch is capable of being selectively coupled to one of the second terminal of the mode selection switch and the third terminal of the mode selection switch, wherein the second terminal of the mode selection switch is coupled to a first terminal of the photosensitive device, wherein a second terminal of the photosensitive device is coupled to a first terminal of the power source, wherein the third terminal of the mode selection switch is coupled to a first terminal of the variable resistor, wherein a second terminal of the variable resistor is coupled to the first terminal of the power source, wherein a second terminal of the power source is coupled to one of the first electrode and the second electrode, and the other of the first electrode and the second electrode is coupled to a first terminal of the power switch, and wherein a second terminal of the power switch is coupled to the first terminal of the mode selection switch.

2. The spectacles according to claim 1, wherein the frame is elastic.

3. The spectacles according to claim 2, the spectacles further comprising an elastic support portion adjacent to the frame and providing support between the first portion and the second portion.

4. The spectacles according to claim 1, the spectacles further comprising a second hydrophobic dielectric film disposed on an inner surface of the first portion.

5. The spectacles according to claim 4, the spectacles further comprising a hydrophilic dielectric film disposed on an inner surface of the second portion.

6. The spectacles according to claim 1, the spectacles further comprising a hydrophilic dielectric film disposed on an inner surface of the second portion.

7. The spectacles according to claim 1, wherein a distance between the first portion and the second portion is configured to generate a capillary force for driving the colored liquid.

8. The spectacles according to claim 7, wherein the distance between the first portion and the second portion is about 1 mm.

9. The spectacles according to claim 1, wherein the colored liquid comprises one of a polar liquid and a non-polar liquid.

* * * * *

UNITED STATES PATENT AND TRADEMARK OFFICE
CERTIFICATE OF CORRECTION

| | |
|---|---|
| PATENT NO. | : 11,442,292 B2 |
| APPLICATION NO. | : 16/344930 |
| DATED | : September 13, 2022 |
| INVENTOR(S) | : Tingting Wang et al. |

It is certified that error appears in the above-identified patent and that said Letters Patent is hereby corrected as shown below:

In the Specification

Column 2, Line 50, delete "along line AN" and insert therefor -- along line AA' --.

Signed and Sealed this
Fifteenth Day of November, 2022

Katherine Kelly Vidal
*Director of the United States Patent and Trademark Office*